(12) United States Patent
Calciolari et al.

(10) Patent No.: US 6,287,092 B1
(45) Date of Patent: Sep. 11, 2001

(54) COUNTERWEIGHT FOR HERMETIC COMPRESSORS

(75) Inventors: Leonelo Antonio Calciolari; José Mario Silva, both of São Carlos (BR)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/722,887

(22) Filed: Nov. 27, 2000

Related U.S. Application Data

(62) Division of application No. 09/261,813, filed on Mar. 3, 1999, now Pat. No. 6,195,888.

(30) Foreign Application Priority Data

Mar. 11, 1998 (BR) .................................................. 7800635 U

(51) Int. Cl.[7] .................................................. F04B 35/04
(52) U.S. Cl. .......................................... 417/415; 74/573 R
(58) Field of Search ........................... 417/415; 74/573 R

(56) References Cited

U.S. PATENT DOCUMENTS

| | | | |
|---|---|---|---|
| 1,261,053 | 4/1918 | O'Brien . | |
| 1,917,701 | 7/1933 | Crites et al. . | |
| 3,181,779 | 5/1965 | Rhodes | 230/172 |
| 3,491,939 | 1/1970 | Larsen et al. | 230/206 |
| 3,587,343 | 6/1971 | Sonderborg | 74/603 |
| 4,342,236 | 8/1982 | Everts | 74/603 |
| 4,406,590 | 9/1983 | Kessler | 417/360 |
| 4,576,555 | * 3/1986 | Ashenfelter | 417/372 |
| 4,836,755 | 6/1989 | Nitsche et al. | 417/368 |
| 4,846,123 | 7/1989 | Bolton, Jr. | 123/192 B |
| 4,900,237 | * 2/1990 | Reedy | 417/356 |
| 5,218,762 | 6/1993 | Netto Da Costa | 29/888.02 |
| 5,226,306 | 7/1993 | Yoshino et al. | 72/313 |
| 5,247,825 | 9/1993 | Erickson | 72/339 |

* cited by examiner

Primary Examiner—Charles G. Freay
(74) Attorney, Agent, or Firm—Baker & Daniels

(57) ABSTRACT

A hermetic compressor assembly having a housing having disposed therein an electric motor including a stator and a rotor drivingly attached to a crankshaft having an eccentric portion, and a compression mechanism operatively coupled to the crankshaft eccentric portion. A counterweight is attached to the crankshaft and is made of progressively stamped metal stock material having selectively varying widths between first and second side edges thereof. The counterweight has one of a plurality of weights, each individual weight directly corresponding to a different stock material width. Also, a method for manufacturing compressors having installed therein counterweights of different weights and having substantially identical axial projection profiles, wherein the counterweights are made by a method which includes providing a progressive stamping die, and planar metal stock material having one of a plurality of different widths between first and second opposite side edges. The stock material is fed through the progressive stamping die in a direction substantially parallel with the first side edge. A counterweight having a weight which variably corresponds to the different stock material widths and having a free edge defined by the first stock material edge is progressively formed from the stock material, and is then separated from the stock material.

19 Claims, 3 Drawing Sheets

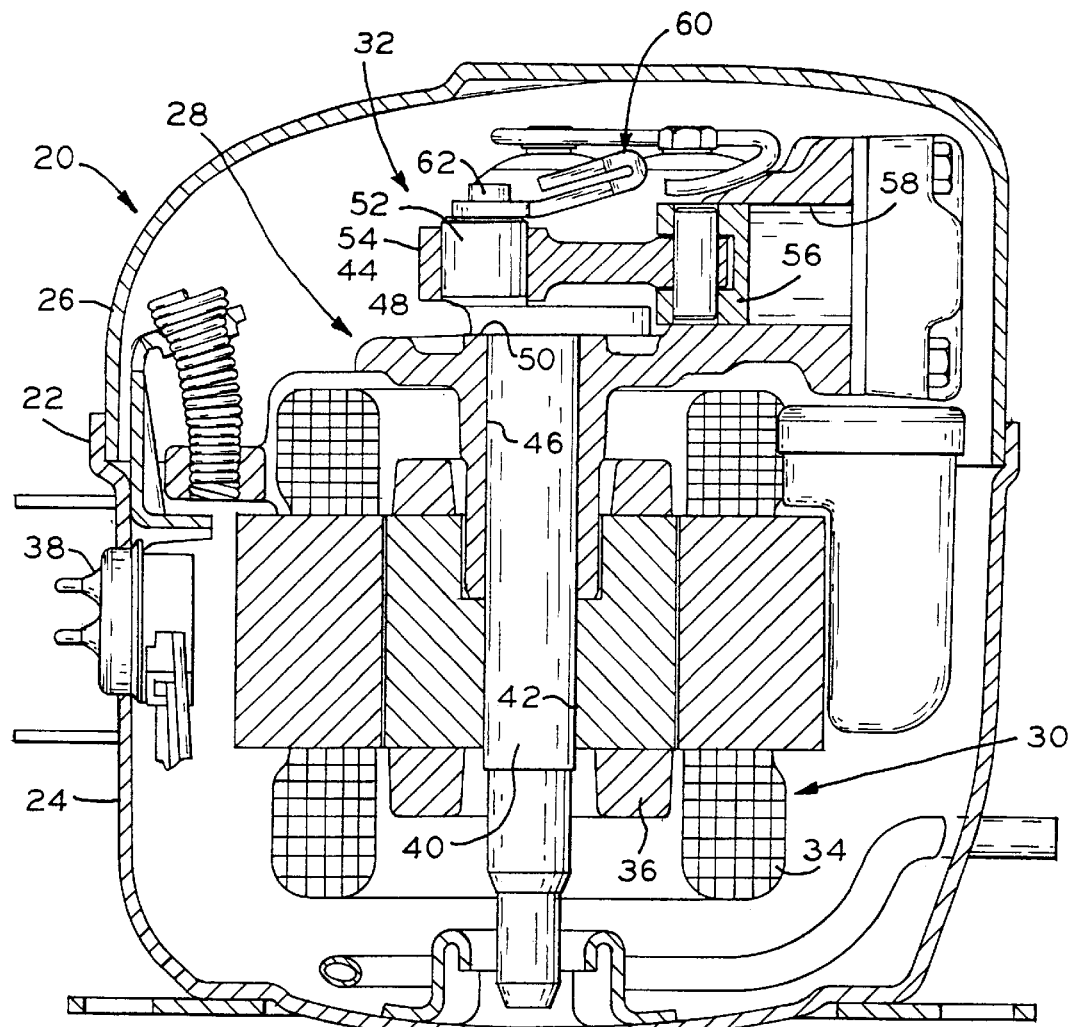
FIG_1
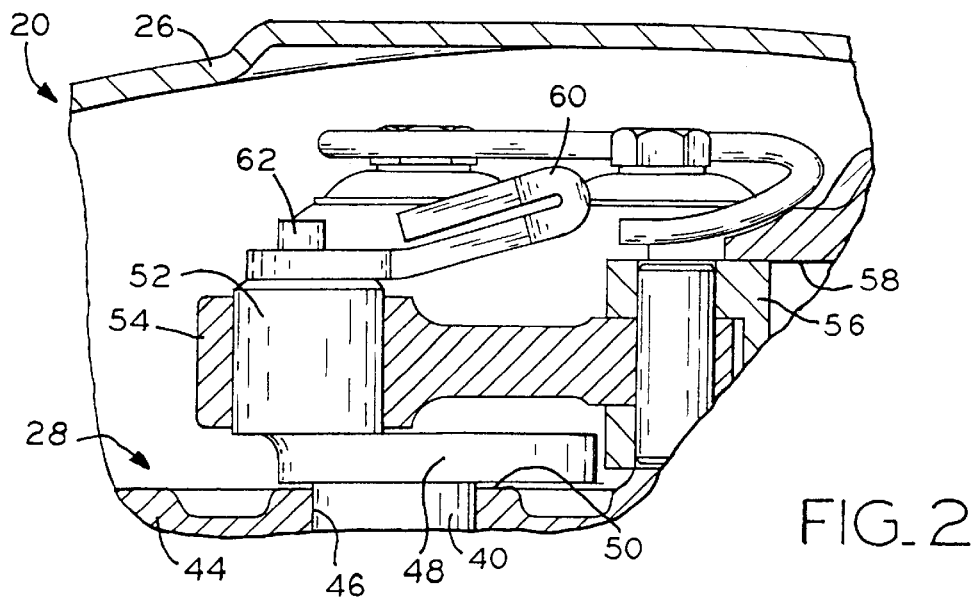
FIG_2

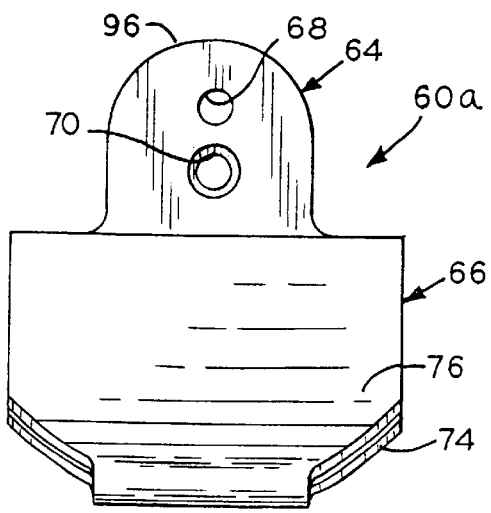
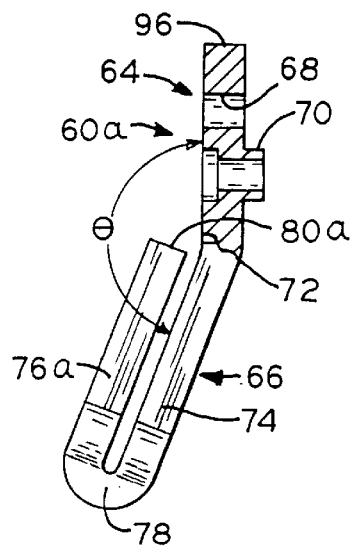
FIG_3    FIG_4
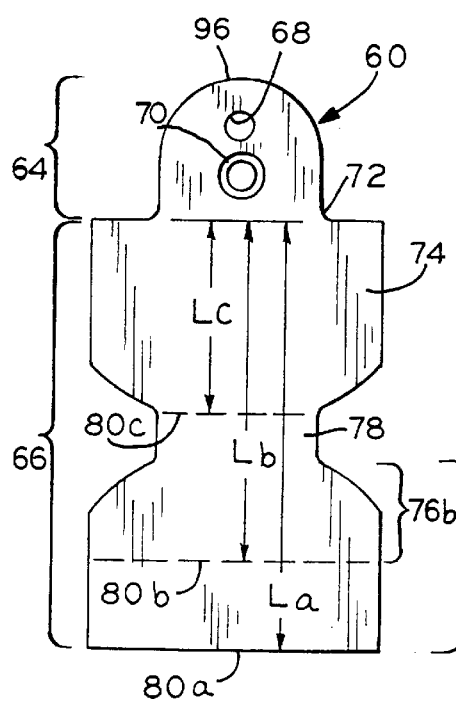
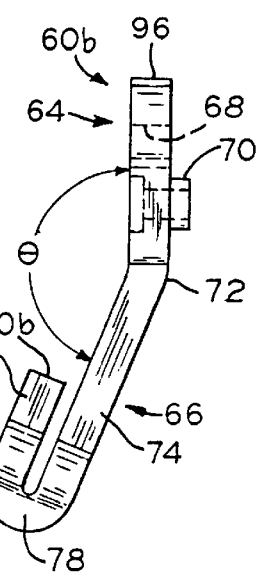
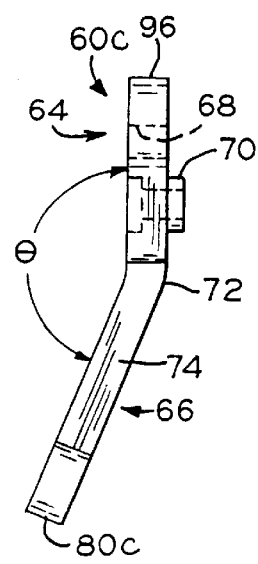
FIG_5    FIG_6    FIG_7

COUNTERWEIGHT FOR HERMETIC COMPRESSORS

This application is a division of U.S. patent application Ser. No. 09/261,813, filed Mar. 3, 1999, now U.S. Pat. No. 6,195,888.

BACKGROUND OF THE INVENTION

Hermetic compressors typically include a crankshaft having an eccentric portion coupled to a compression mechanism which is driven when the crankshaft rotates. For example, the compression mechanism may comprise a piston slidably disposed in a cylinder, the piston operatively coupled to the eccentric of the rotating crankshaft by a connecting rod, whereby the orbiting motion of the eccentric about the axis of rotation of the crankshaft imparts reciprocating motion to the piston. Due to the dynamic imbalance of the operating compression mechanism, counterweights are often attached to the crankshaft, in some cases directly attached to the eccentric of the crankshaft, to offset the inertial loads generated by the moving members of the compression mechanism and by the eccentric itself.

Previous counterweights for hermetic compressors have been formed directly into the crankshaft or comprise a separate piece assembled thereto, the separate piece being, for example, formed of powdered metal or of stamped sheet metal. Previous stamped sheet metal counterweights, however, have been formed by stamping operations which are unique to the size and weight requirements of a particular counterweight designed to balance only a particular compressor assembly. For example, a product line of several reciprocating piston compressor assemblies, each substantially similar except for the displacement of the compression mechanism, may require unique counterweight tooling to manufacture each of the variety of several counterweights necessary to accommodate all of the compressor assemblies in the product line. A method of providing a variety of stamped sheet metal counterweights, each having different weights but substantially similar in size, whereby a variety of different compressor assembly designs may be balanced, is desirable.

SUMMARY OF THE INVENTION

The present invention provides a hermetic compressor assembly having a housing having disposed therein an electric motor including a stator and a rotor drivingly attached to a crankshaft having an eccentric portion, and a compression mechanism operatively coupled to the crankshaft eccentric portion. A counterweight is attached to the crankshaft and is made of progressively stamped metal stock material having selectively varying widths between first and second side edges thereof. The counterweight has one of a plurality of weights, each individual weight directly corresponding to a different stock material width.

The present invention also provides a method for manufacturing compressors having installed therein counterweights of different weights and having substantially identical axial projection profiles, wherein the counterweights are made by a method which includes providing a progressive stamping die, and planar metal stock material having one of a plurality of different widths between first and second opposite side edges. The stock material is fed through the progressive stamping die in a direction substantially parallel with the first side edge. A counterweight having a weight which variably corresponds to the different stock material widths and having a free edge defined by the first stock material edge is progressively formed from the stock material, and is then separated from the stock material.

The present invention also provides a method of manufacturing a counterweight having the steps of feeding planar stock having side edges and an axial dimension to one or more stamping dies, stamping a segment of the stock into a desired shape, folding the stamped segment in a direction substantially perpendicular to the axial dimension of the stock such that the segment folds back on itself and one of the side edges forms a free end in overlapping arrangement to the segment, and detaching the segment from the stock.

The present invention also provides a method of manufacturing a compressor having installed therein a counterweight, wherein the counterweight is made by a method comprising the steps of: feeding planar stock having side edges and an axial dimension to one or more stamping dies; stamping a segment of the stock into a desired shape; folding the stamped segment in a direction substantially perpendicular to the axial dimension of the stock such that the segment folds back on itself and one of the side edges forms a free end in overlapping arrangement to the segment; and detaching the segment from the stock.

The present invention further provides a method of manufacturing a plurality of sets of compressors having installed therein respective sets of counterweights, each counterweight of one set having a different weight than each counterweight of another set, wherein the counterweights are made by a method which includes the steps of providing a first substantially planar stock material having one of a plurality of widths between side edges into a die, forming a first counterweight having an edge which is defined by one of the side edges of the first stock material, and separating the first counterweight from the first stock material, the separated first counterweight being one of a first set of counterweights. The method further includes the steps of providing a second substantially planar stock material having a different one of a plurality of widths between side edges into the same die, forming a second counterweight having an edge which is defined by one of the side edges of the second stock material, and separating the second counterweight from the second stock material, the separated second counterweight being one of a second set of counterweights.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a cross-sectional side view of one type of hermetic compressor assembly which includes a first embodiment of a counterweight according to the present invention;

FIG. 2 is an enlarged fragmentary side sectional view of a portion of the compressor shown in FIG. 1;

FIG. 3 is an axial view of the counterweight shown in the compressor of FIGS. 1 and 2;

FIG. 4 is a partial section side view of the counterweight of FIG. 3;

FIG. 5 is the counterweight of FIG. 3 unfolded, and further shows the locations of the free edges of further embodiments of counterweights according to the present invention;

FIG. 6 is a side view of a second embodiment of a counterweight according to the present invention;

FIG. 7 is a side view of a third embodiment of a counterweight according to the present invention;

Figures 8A, 8B:
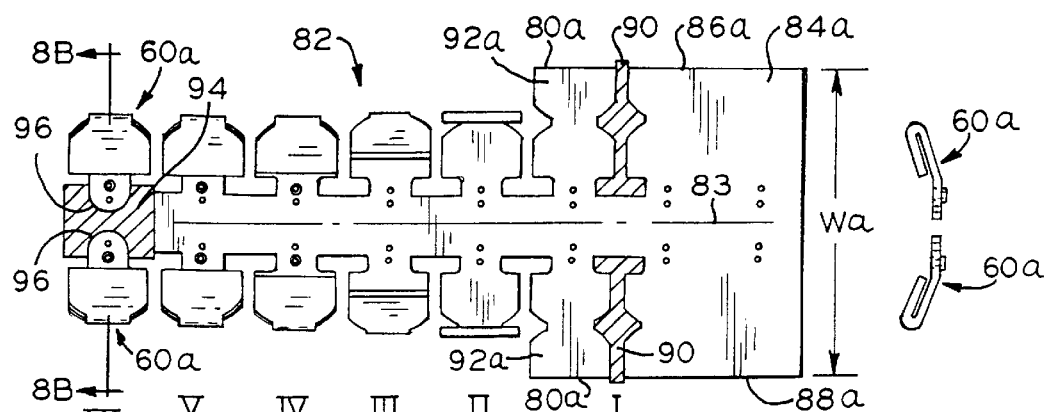
FIG. 8A is a schematic plan view of a progressive die apparatus, also showing sheet metal stock of width "a" therein and counterweights according to the first embodiment being formed therefrom.
FIG. 8B is a section side view of a pair of finished counterweights according to the first embodiment along line 8B—8B of FIG. 8A.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in alternative forms, and such exemplifications are not to be construed as limiting the scope of the invention in any manner.

DETAILED DESCRIPTION OF THE INVENTION

Referring first to FIG. 1, there is shown compressor assembly 20 which comprises housing 22 having lower portion 24 and upper portion 26 which are sealably attached to one another as by welding or brazing. Suspended within housing 22 is electric motor and compression mechanism subassembly 28 comprising electric motor 30 and compression mechanism 32. Electric motor 30 comprises stator 34 which surrounds rotor 36. Electrical power is provided to the windings of stator 34 through terminal cluster 38, thereby imparting rotating motion to rotor 36 in the well-known manner. Crankshaft 40 is press-fitted within central aperture 42 of rotor 36 and extends therethrough.

Stator 34 is attached to frame 44 of subassembly 28, which is provided with journal portion 46 which radially supports shaft 40 which extends therethrough. Shaft 40 is also provided with thrust portion 48 which slidably abuts thrust pad 50 of frame 44, thereby axially supporting shaft 44 and rotor 36 within the subassembly. Adjacent shaft thrust portion 48 is shaft eccentric 52 about which is rotatably disposed connecting rod 54.

Connecting rod 54 is attached to piston 56 and, as crankshaft 40 rotates, causes piston 56 to reciprocate within cylinder 58 in the well-known manner for compressing refrigerant gas within compressor assembly 20. Counterweight 60 is attached to the axial end of eccentric shaft portion 52 by bolt 62 as will be discussed further hereinbelow. FIG. 2 is an enlarged fragmentary portion of FIG. 1 showing the inventive counterweight 60.

Although compressor assembly 20 is of a reciprocating piston type, the present invention should not be construed as being so limited, for it is to be understood that the present invention may also be applied to other types of compressor or pumps wherein counterweights would ordinarily be prescribed for offsetting dynamic imbalances.

Referring now to FIG. 3 there is shown an axial end view of a first embodiment of counterweight 60. Counterweight 60a represents a first embodiment of counterweight 60 which is of a maximum weight and, as will be discussed further hereinbelow, is formed from sheet or strip metal stock material which has a maximum width between opposite first and second side edges. Counterweight 60a comprises first and second portions 64 and 66, respectively. First counterweight portion 64 is provided with aperture 68 through which bolt 62 extends, bolt 62 threadedly received in a hole (not shown) provided in the axial end of eccentric 52. To prevent rotation of the counterweight relative to eccentric 52, first counterweight portion 64 is also provided with axially-extending protuberance 70 which is received in a recess (not shown) provided in the axial end of eccentric 52 adjacent the threaded hole therein, thereby preventing the counterweight from rotating about bolt 62.

As best shown in FIG. 4, each of first and second counterweight portions 64, 66 are attached at junction 72 and are each substantially planar. Further, it can be seen that first and second counterweight portions 64, 66 are oriented at an obtuse angle θ relative to one another, thereby providing clearance for counterweight 60 to rotate with shaft 40 without interfering with connecting rod 54 or piston 56. Second counterweight portion 66 comprises first and second planar sections 74, 76, respectively. Planar sections 74, 76 are attached by portion 78 of the strip stock material which extends therebetween. As shown, stock material portion 78 is formed into a U-shape, having a bend of approximately 180°. Therefore, it will be understood that planar sections 74 and 76 overlie one another and the thickness of planar second counterweight portion 66 is thus at least twice the thickness of the stock material. FIG. 5 shows counterweight 60a in an unfolded state. The dashed lines therein identifying the locations of free edges associated with further embodiments of the inventive counterweight described below.

Referring now to FIG. 6, there is shown a second embodiment of the inventive counterweight. Counterweight 60b is identical in structure to counterweight 60a except that second planar section 76b of its second counterweight portion 66 is shorter than second planar section 76a of counterweight 60a, and thus has less mass. Counterweight 60b is manufactured using the same apparatus and method which produces counterweight 60a, but is formed from stock material which has a smaller width between opposite first and second side edges.

That is to say, each of the embodiments of the inventive counterweight are provided on the same tooling. The differences between the shown embodiments are generated only by processing stock material having different widths between their first and second side edges through the progressive die apparatus.

Referring now to FIG. 7, there is shown a third embodiment of the inventive counterweight which is identical in structure to counterweights 60a and 60b, except that its second portion 66 does not include second planar section 76, and thus has even less mass. That is to say, counterweight 60c does not include U-shaped stock material portion 78 or overlying second planar section 76. Counterweight 60c is manufactured using the same apparatus and method which produces counterweights 60a and 60b, but is formed from stock material which has an even smaller width between opposite first and second side edges than the material from which the first and second counterweight embodiments are made. Notably, the truncated or free edge at the end of first planar section 74 of counterweight 60c is most remote from first counterweight portion 64.

Referring again to FIG. 3, it is seen that an axial projection of counterweight 60a presents a profile or outline which is generally defined by the outer periphery of the shown figure. It will be understood that in their finished forms, each of the three depicted counterweight embodiments, when so axially projected, will have substantially identical profiles.

Referring again to FIG. 5, which shows first embodiment of the counterweight 60a in its unfolded state, the relationship between the three depicted embodiments is readily seen. As noted above, the three counterweight embodiments are structurally identical except for their second portions 66, which includes free edge 80 which is defined by the edge of the respective stock material from which a counterweight is made. As shown, counterweight 60a has free edge 80a; should images of counterweights 60b and 60c, in their unfolded states, be superimposed on FIG. 5, their respective free edges 80b and 80c would be located as indicated by the dashed lines. Each counterweight 60a, 60b, 60c has a length L from their common junction 72 to their respective edges 80a, 80b, 80c. Length L varies with the width of the stock material used to produce the counterweight; this is shown with reference to lengths La, Lb and Lc, respectively associated with counter weights 60a, 60b and 60c. Thus, length La of second counterweight portion 66 in counterweight 60a extends from junction 72 along first planar section 74 through stock material portion 78 and along second planar section 76a to edge 80a. Similarly, length Lb of second counterweight portion 66 in counterweight 60b extends from junction 72 along first planar section 74 and through stock material portion 78 and through second planar section 76b to counterweight edge 80b. In counterweight 60c, length Lc of second counterweight portion 66 extends from junction 72 to edge 80c at the distal end of second counterweight portion 66 and first and only planar section 74. Because second planar sections 76 of counterweights 60a and 60b are folded over their first planar sections 74 (see FIGS. 4 and 6) and counterweight 60c has no second planar section 76 (see FIG. 7), it can be understood that the distance from counterweight edge 80 to the axial end of crankshaft extension 52 is inversely proportional to the length of second counterweight portion 66.

Figures 9A, 9B:
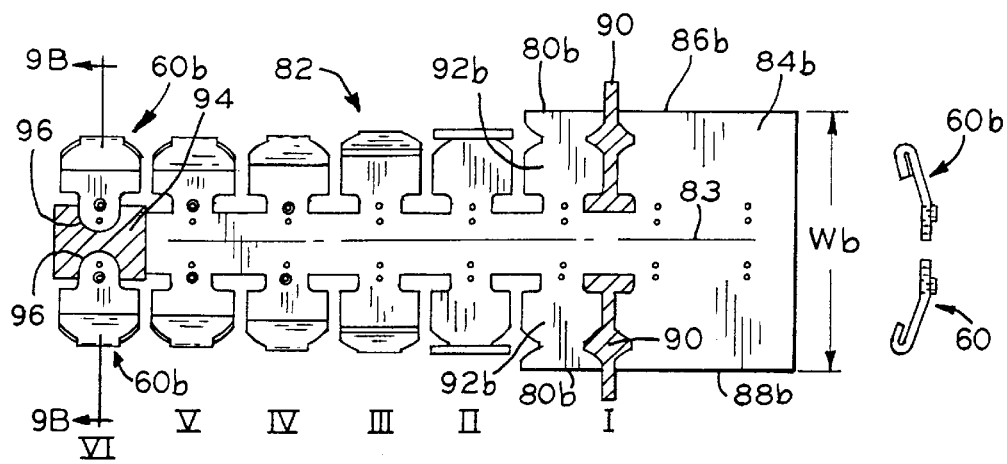
FIG. 9A is a schematic plan view of the same progressive die apparatus as shown in FIG. 8A, also showing sheet metal stock of width "b" therein and counterweights according to the second embodiment being formed therefrom.
FIG. 9B is a section side view of a pair of finished counterweights according to the second embodiment along line 9B—9B of FIG. 9A.
Figures 10A, 10B:
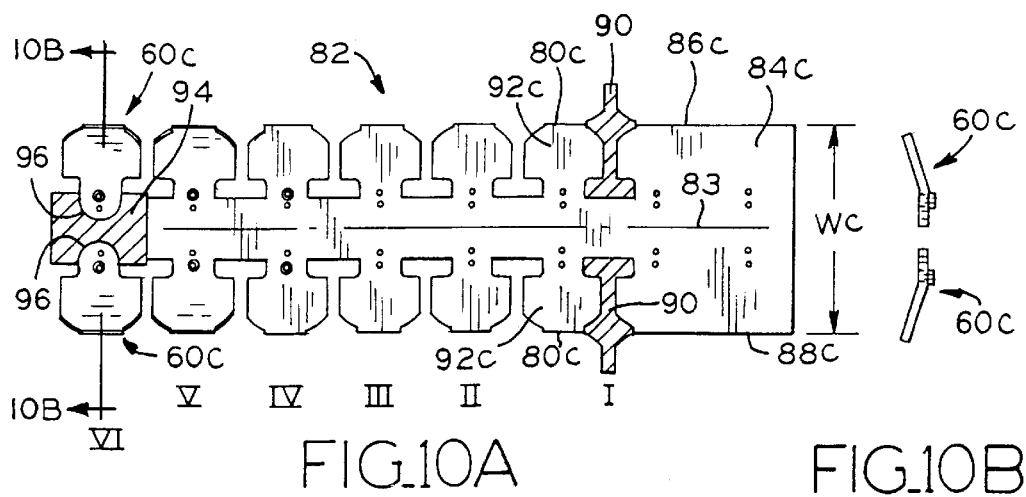
FIG. 10A is a schematic plan view of the same progressive die apparatus as shown in FIGS. 8A and 9A, also showing sheet metal stock of width "c" therein and counterweights according to the third embodiment being formed therefrom.
FIG. 10B is a section side view of a pair of finished counterweights according to the third embodiment along line 10B—10B of FIG. 10A.

Each of edges 80a, 80b and 80c are defined by, and are, a side edge of the stock material which is progressively stamped. Therefore, by forming stock material of different widths between its first and second side edges through a common progressive stamping die apparatus, counterweights of different weights but with substantially identical shape and size may be easily manufactured. Referring now to FIGS. 8A, 9A and 10A, there is shown progressive stamping die apparatus 82 into which stock material 84 of various widths is fed.

As seen by comparing FIGS. 8A, 9A and 10A, stock material 84 has varying widths Wa, Wb, Wc, which respectively produce counterweights 60a, 60b and 60c. As discussed above, Wa is greater than Wb, and Wb is greater than Wc. Each of stock material members 84a, 84b and 84c has first and second side edges 86 and 88. Apparatus 82 has central axis 83 about which the dies of apparatus 82 are symmetrical. Axis 83 also coincides with the longitudinal centerline of the stock material equidistant between its respective first and second side edges 86, 88. Stock material 84 is longitudinally fed through apparatus 82, in a direction along axis 83.

Apparatus 82 is the only die apparatus necessary to produce the variety of counterweights 60 above described. Apparatus 82 has a plurality of die stations labeled I through VI, the upper dies of which may be respectively ganged together and cycled simultaneously to interact with their corresponding lower dies, with stock material 84 advancing through the apparatus by one die station along axis 83 between each cycle. Once punch 90 of apparatus 82 cycles, at station I of the apparatus, a pair of blanks 92 appears in the stock material. Each of the pair of blank forms 92 includes edge 80 which is defined by stock material edges 86 and 88.

As blank 92 proceeds through apparatus 82, to the left in FIGS. 8–10, the upper and lower die sets at each of stations II through V interact to shape the blank into a further-finished form. Notably, however, the blank associated with counterweight 60c (FIG. 10A), is not formed at die stations II–IV, which act to fold section 76 over section 74, because this blank has no second planar section 76; width Wc of stock member 84c is so narrow that the material does not extend between the upper and lower dies at these three stations. At station V, first and second counterweight portions 64 and 66 are bent relative to one another to form angle θ in the counterweight.

At station VI, a pair of counterweights are separated from the stock material on opposite sides of axis 83. Separating punch 94 also forms outside edge 96 which partly defines first counterweight portion 64. The resulting counterweights are shown in cross-section in FIGS. 8B, 9B and 10B. Although the pair of counterweights formed on opposite sides of axis 83 are preferably identical, the method of the present invention may be modified to feed stock material of an alternative width (not shown) through apparatus 82 such that the longitudinal centerline of the stock material, which lies equidistantly between edges 86 and 88, is offset from axis 83, thereby producing one embodiment of a counterweight (e.g., 60a) on one side of axis 83, and a different embodiment (e.g., 60c) on the other side of axis 83.

While this invention has been described as having preferred designs, the present invention can be further modified within the spirit and scope of this disclosure. For example, counterweights of varying weights may be produced according to the present invention having shapes which deviate from those of the embodiments above described. Therefore, this application is intended to cover any variations, uses or adaptations of the invention using its general principles. Further, this application is intended to cover such departures from the present disclosure as come within known or customary practice in the art to which this invention pertains and which fall within the limits of the appended claims.

What is claimed is:

1. A compressor assembly comprising:

a housing;

a compression mechanism disposed in said housing;

a crankshaft having an eccentric portion, said eccentric portion operatively engaged with said compression mechanism;

an electric motor disposed in said housing, said motor drivingly engaged with said crankshaft, whereby said compression mechanism is driven by said motor through said crankshaft; and a counterweight attached to said crankshaft, said counterweight having first and second planar sections joined by a portion integral with and extending from said first and second planar sections, said first and second planar sections lying in different planes.

2. The compressor assembly of claim 1, wherein said counterweight is attached to said crankshaft eccentric portion.

3. The compressor assembly of claim 1, wherein said planes are substantially parallel.

4. The compressor assembly of claim 3, wherein said second planar section has a free end which overlies said first planar section.

5. The compressor assembly of claim 4, wherein said first and second planar sections have a common width.

6. The compressor assembly of claim 4, wherein said first and second planar sections are of substantially equal length.

7. The compressor assembly of claim 4, wherein said second planar section is substantially shorter in length than said first planar section.

8. The compressor assembly of claim 1, wherein said counterweight comprises first and second planar portions, said counterweight second planar portion comprises said first and second planar sections, and said counterweight first portion is attached to said crankshaft.

9. The compressor assembly of claim 8, wherein said first and second planar portions have an obtuse angle therebetween.

10. The compressor assembly of claim 1, further comprising means for preventing rotation of said counterweight relative to said crankshaft.

11. The compressor assembly of claim 1, wherein said first and second planar sections are joined by a substantially U-shaped portion.

12. A compressor assembly comprising:

a housing;

a compression mechanism disposed within said housing;

a crankshaft having an eccentric portion operatively engaged with said compression mechanism;

an electric motor disposed in said housing and having a stator and a rotor, said rotor rotatably fixed to said crankshaft; and a counterweight attached to said crankshaft, said counterweight comprising a unitary piece of sheet metal having formed therein first and second planar sections, said second planar section overlying said first planar section.

13. The compressor assembly of claim 12, wherein said first and second planar sections are substantially parallel.

14. The compressor assembly of claim 13, wherein said counterweight further comprises a U-shaped portion extending between said first and second planar sections.

15. The compressor assembly of claim 13, wherein said first and second planar sections each have first and second lateral edges, said first and second lateral edges of said planar sections respectively being substantially aligned.

16. The compressor assembly of claim 13, wherein said first and second planar sections have substantially equal lengths.

17. The compressor assembly of claim 13, wherein said first and second planar sections have substantially different lengths.

18. The compressor assembly of claim 17, wherein the length of said first planar section is greater than the length of said second planar section.

19. A compressor assembly comprising:

a housing;

a compression mechanism disposed in said housing;

a crankshaft having an eccentric portion, said eccentric portion operatively engaged with said compression mechanism;

an electric motor disposed in said housing, said motor drivingly engaged with said crankshaft, whereby said compression mechanism is driven by said motor through said crankshaft; and a counterweight attached to said crankshaft, said counterweight being formed by a process which includes feeding planar stock having side edges and an axial dimension to one or more stamping dies, stamping a segment of the stock into a desired shape, folding the stamped segment in a direction substantially perpendicular to the axial dimension of the stock such that the segment folds back on itself and one of the stock side edges forms a free end in overlapping arrangement to the segment, and detaching the segment from the stock.

* * * * *